(12) United States Patent
Moriguchi et al.

(10) Patent No.: US 6,515,882 B2
(45) Date of Patent: Feb. 4, 2003

(54) POWER SUPPLY APPARATUS FOR LAMP

(75) Inventors: Haruo Moriguchi, Itami; Kenzo Danjo, Kyoto-fu; Takashi Tsujii, Hirakata; Masataka Nishimura, Izumi, all of (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 0 days.

(21) Appl. No.: 09/843,539

(22) Filed: Apr. 26, 2001

(65) Prior Publication Data

US 2002/0001209 A1 Jan. 3, 2002

(30) Foreign Application Priority Data

Apr. 27, 2000 (JP) .......................... 12-127138

(51) Int. Cl.[7] .......................... H02M 3/24; H05B 41/36
(52) U.S. Cl. .......................... 363/97; 363/37; 315/307; 315/DIG. 7
(58) Field of Search .............................. 363/37, 49, 95, 363/97, 131; 323/284, 901; 3/905; 315/306, 307, 219, DIG. 7

(56) References Cited

U.S. PATENT DOCUMENTS

| | | | |
|---|---|---|---|
| 4,672,300 A | * | 6/1987 | Harper ..................... 363/97 X |
| 4,870,327 A | * | 9/1989 | Jorgensen ................. 315/307 |
| 5,068,578 A | * | 11/1991 | Wegner ................... 363/37 X |
| 6,172,889 B1 | * | 1/2001 | Eguichi et al. ............... 363/95 |

FOREIGN PATENT DOCUMENTS

JP    SHO 59-37556 B    9/1984

* cited by examiner

*Primary Examiner*—Jessica Han
(74) *Attorney, Agent, or Firm*—Duane Morris (57) ABSTRACT

A power supply apparatus useful for starting and driving a discharge lamp 22 includes a DC-to-DC converter 16 for converting a DC signal from a DC power supply to a second DC signal having a predetermined magnitude which is supplied to the lamp. A current detector 24 develops a DC current representative signal representing DC current supplied to the lamp from the DC-to-DC converter. A combination of the current detector 24, a DC voltage detector 26 and a multiplier 30 develops a DC power representative signal representing DC power supplied from the DC-to-DC converter to the lamp. An error amplifier 32 develops a DC current error signal representing the difference between the DC current representative signal and a predetermined DC current reference signal. An error amplifier 36 develops a DC power error signal representing the difference between the DC power representative signal and a predetermined power reference signal. For a predetermined time period following the start of operation of the power supply apparatus, a combination of a delay circuit 42, a comparator 48 and a clamping diode 52 clamps the DC power error signal so that only the DC current error signal can be outputted. A driver unit 18 controls the DC-to-DC converter 16 in such a manner as to make the DC current error signal zero.

7 Claims, 5 Drawing Sheets

POWER SUPPLY APPARATUS FOR LAMP

The present invention relates to a power supply apparatus suitable for use in starting and driving lamps such as discharge lamps.

BACKGROUND OF THE INVENTION

Figure 1:
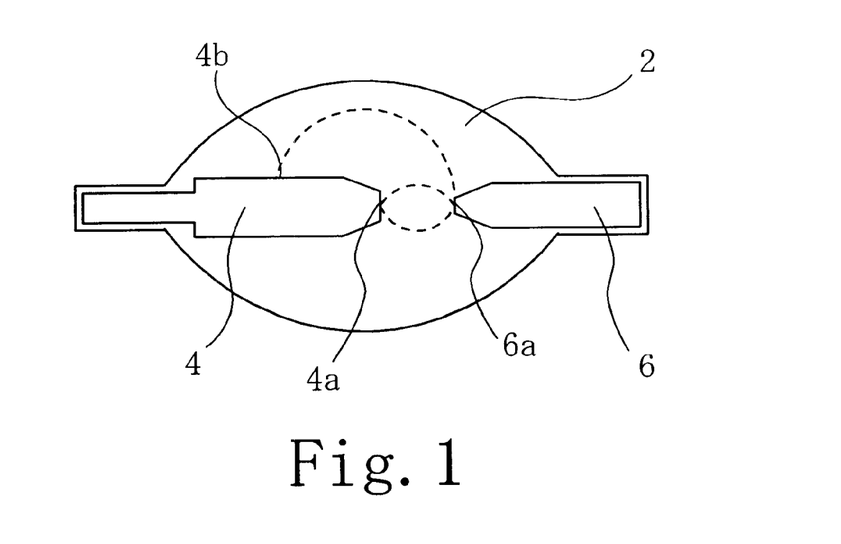
FIG. 1 is a side view of a xenon lamp.

An example of discharge lamps is a xenon lamp. As shown in FIG. 1, a xenon lamp includes a glass tube 2 in which an anode electrode 4 and a cathode electrode 6 are spaced by several millimeters. The tube 2 is filled with xenon gas at several atm. An arc discharge is produced between the tip end 4a of the anode electrode 4 and the tip end 6a of the cathode electrode 6 when constant current flows between the anode electrode 4 and the cathode electrode 6, and the lamp starts to emit light at voltage and current at a stable operating point C on a xenon lamp current-voltage characteristic curve shown in FIG. 2.

Figure 2:
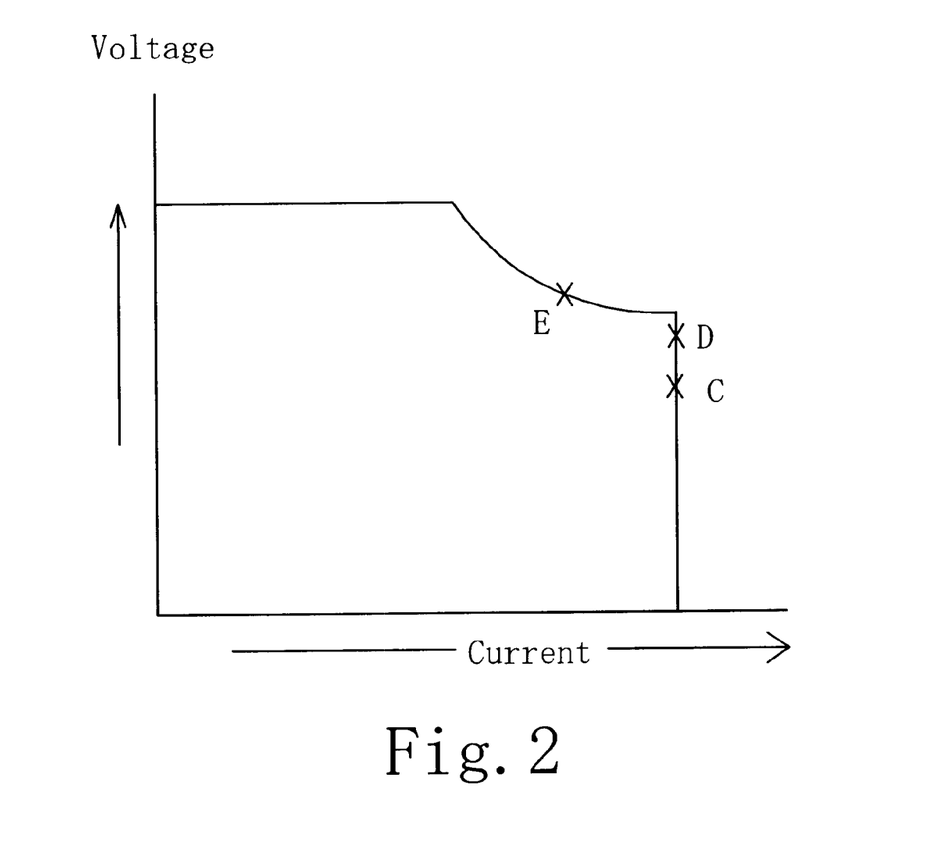
FIG. 2 shows a voltage-current characteristic of a xenon lamp powered from a prior art power supply apparatus.

As the end of the life of the xenon lamp approaches, the amount of consumption of the anode electrode 4 and the cathode electrode 6 increases, and the pressure within the glass tube 2 reduces, resulting in increase of impedance of the xenon lamp. This, in turn, causes the voltage between the anode electrode 4 and the cathode electrode 6 to increase, so that the stable operating point moves from the point C to a point D. This means the power consumption of the xenon lamp increases, and the heat generated also increases, resulting in melting of the anode electrode 4 and the cathode electrode 6. In the worst case, the xenon lamp may burst.

Japanese Examined Patent Publication (KOKOKU) No. SHO 59-37556 B2, published on Sep. 10, 1984, the applicant being the assignee of the present application, discloses an apparatus in which current flowing through a xenon lamp is reduced when the voltage applied to the lamp increases above a predetermine value, whereby increase of power consumed by the lamp is suppressed. The technique to reduce the current in the xenon lamp shown in this Japanese publication is to provide constant-power control, not constant-current control, when the output voltage exceeds a reference voltage, so that the stable operating point moves to a point E on the characteristic curve shown in FIG. 2.

It may occur that the xenon lamp having its life nearing to its end is energized to emit light by causing an arc to be generated between the tip end 4a of the anode electrode 4 and the tip end 6a of the cathode electrode 6 and, then, deenergized to stop emitting light by interrupting the supply of power to the lamp. In such a case, it may sometimes occur that when the lamp is re-energized after it is cooled down, an arc is generated not between the tip end 4a of the anode electrode 4 and the tip end 6a of the cathode electrode 6, but between other parts of the electrodes. For example, an arc may tend to be generated between a side 4b of the anode electrode 4 and the tip end 6a of the cathode electrode 6 as shown in FIG. 1. Since the distance between the side 4b and the tip end 6a is larger than the distance between the tip ends 4a and 6a, the impedance of the xenon lamp increases. According to the invention disclosed in the above-cited Japanese publication, because an increased impedance causes the voltage between the anode electrode 4 and the cathode electrode 6 to exceed a predetermined voltage, constant-power controlled power is applied to the lamp. The applied power may be insufficient to generate an arc discharge, so that the xenon lamp may not be ignited. In this case, if the xenon lamp is ignited by some means, the arc discharge between, for example, the side 4b and the tip end 6a gradually moves to the space between the tip ends 4a and 6a and is stabilized.

An object of the present invention is to provide a power supply apparatus which not only can ignite a lamp having a life near to its end, but also can sustain a stable operation of the lamp once ignited, by providing constant-power control.

SUMMARY OF THE INVENTION

A power supply apparatus for lamps according to the present invention includes a DC power supply. The DC power supply may be provided by converting commercial AC power into DC power. A DC-to-DC converter is provided for converting a DC signal from the DC power supply to have a predetermined value for application to a lamp. The DC-to-DC converter is a controllable. converter which can be controlled to provide output current or power having a predetermined value in response to a input control signal described later. A DC current detector detects a DC current supplied from the DC-to-DC converter to the lamp and develops a DC current representative signal representing the detected DC current. A DC power detector detects DC power supplied from the DC-to-DC converter to the lamp and develops a DC power representative signal representing the detected DC power. An error signal generating unit is provided, which generates a DC current error signal representing the difference between the DC current representative signal and a predetermined DC current reference signal, and a DC power error signal representing the difference between the DC power representative signal and a predetermined DC power reference signal. The DC current error signal is outputted during a predetermined time period from the start of the operation of the power supply apparatus. A control unit controls the DC-to-DC converter in such a manner that the signals from the error signal generating unit become zero.

By appropriately determining the DC current reference signal, a large current can be supplied to a lamp when the power supply apparatus starts operating, and, therefore, the lamp is turned on without fail even when the life of the lamp is near its end. In case of old lamp, once it is turned on, it can be constant-power controlled, and, therefore, the current supplied to the lamp can be decreased.

The error signal generating unit may include level adjusting means which makes the DC current error signal larger than the DC power error signal when the impedance of the lamp is smaller than a predetermined value, and makes the DC current error signal smaller than the DC power error signal when the impedance of the lamp is larger than the predetermined value. In this case, the error signal generating unit includes further selecting means for selecting a larger one of the DC current error and DC power error signals, and an interrupting circuit for interrupting the generation of the DC power error signal for a predetermined time period starting from the start of supplying the DC signal to the lamp.

With this arrangement, when current starts to be supplied to the lamp, the interrupting circuit prevents the DC power error signal from being generated. Accordingly, the selecting means selects the DC current error signal and applies it to the control unit. The control unit controls the DC-to-DC converter in such a manner as to supply a constant current to the lamp. Thus, for a predetermined time period following the energization of the lamp, a large current is supplied to the lamp, whereby the lamp is turned on without fail even when the lamp has a high impedance. Once the lamp is turned on, the selecting means selects the power error signal when the lamp has a life near to the end, and applies it to the control unit. Accordingly, the power supply apparatus is constant-power controlled so that the current supplied to the lamp is decreased. On the other hand, if the lamp is relatively new one, the selecting means selects and applies the current error signal to the control unit, so that the constant-current control is performed.

The interrupting circuit may include a charged circuit charged by the current representative signal, and a clamp circuit for clamping the power representative signal when the output signal of the charged circuit is smaller than a predetermined interruption reference signal.

With this arrangement, the current representative signal supplied to the charged circuit is substantially constant because the power supply apparatus is constant-current controlled. The charging of the charged circuit with substantially constant-value signal enables precise measurement of the predetermined time during which the generation of the DC power error signal is to be interrupted.

The power detector may include a voltage detector developing a DC voltage representative signal representing the DC voltage applied to the lamp, a level adjuster for adjusting the level of the DC current representative signal, and a multiplier for multiplying the output signal of the level adjuster and the DC voltage representative signal together.

Appropriate adjustment of the level of the DC current representative signal through the level adjuster makes the DC current error signal larger than the DC power error signal when the impedance of the lamp is smaller than the predetermined value and makes the DC current error signal smaller than the DC power error signal when the impedance of the lamp is larger than the predetermined value. Thus, the selecting means can be of a simple configuration which only selects a larger one of the DC current and power error signals. Also, the current detector can be used as part of the power detector, which can simplify the circuit configuration of the power detector.

In addition to the above-described arrangement, the error signal generating unit may include a constant-power control error amplifier which is supplied with the output signal of the multiplier and the DC power reference signal and develops the DC power error signal, and a constant-current control error amplifier which is supplied with the current representative signal from the current detector and the DC current reference signal and develops the DC current error signal. In this case, the selecting means includes a first input terminal at which the DC power error signal from the constant-power control error amplifier is applied, a second input terminal at which the DC current error signal from the constant-current control error amplifier is applied, and an output terminal connected to the control unit. The selecting means includes further a first switching device which is connected between the first input terminal and the output terminal and which is rendered conductive when the signal level at the first input terminal is higher than the signal level at the output terminal. A second switching device of the selecting means is connected between the second input terminal and the output terminal and is rendered conductive when the signal level at the second input terminal is higher than the signal level at the output terminal.

Since the power detector includes the level adjuster, the error signal generating unit can be formed of two error amplifiers, and, in addition, the selecting means can be of a simple configuration using two switching devices which can switch without resort to any special control signals therefor.

The error signal generating unit may have a first DC current reference signal and a second DC current reference signal smaller than the first DC current reference signal. In this case, the error signal generating unit operates to generate the DC current error signal based on the first DC current reference signal and the DC current representative signal for the predetermined time period starting from the start of supplying the DC signal to the lamp. When the predetermined time period lapses, the error signal generating unit generates the DC current error signal based on the second DC current reference signal and the DC current representative signal.

With this arrangement, the current supplied to the lamp when the lamp is started is large because it is prepared based on the first DC current reference signal, and, therefore, even an old lamp of which the life is nearing the end can be started without fail.

The error signal generating unit may include a constant-current control error amplifier to which the DC current representative signal is applied, and a selecting circuit. The selecting circuit receives first and second DC current reference signals and operates in accordance with the output signal from the interrupting circuit to apply the first DC current reference signal to the constant-current control error amplifier during the predetermined time period starting from the start of supplying the DC signal to the lamp and, thereafter, to apply the second DC current reference signal to the constant-current control error amplifier.

This circuit configuration is simple because of the switching of the reference signals to be supplied to a single constant-current control error amplifier.

DETAILED DESCRIPTION OF EMBODIMENTS

Figure 3:
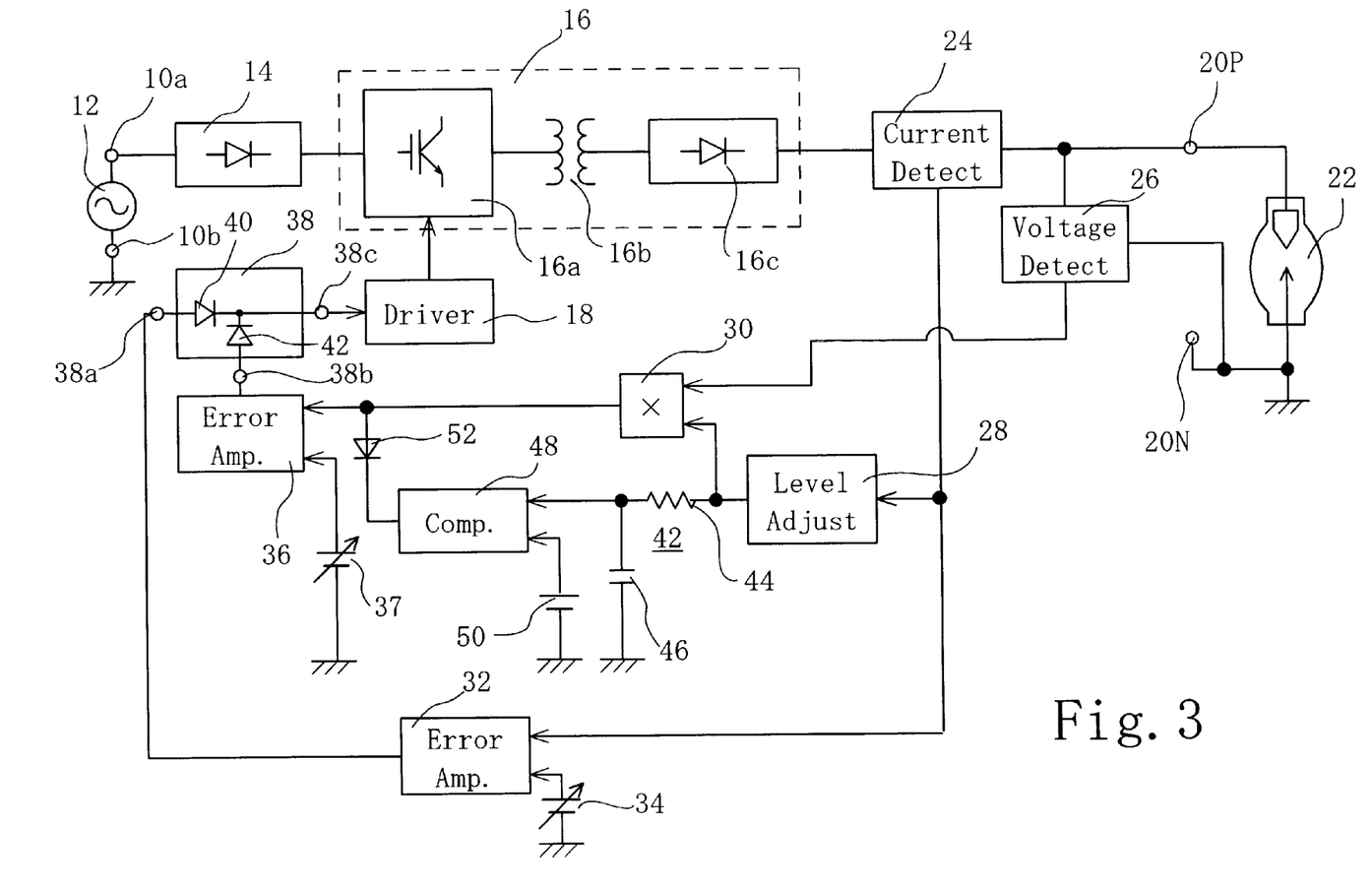
FIG. 3 is a block circuit diagram a power supply apparatus according to a first embodiment of the present invention.

A power supply apparatus according to a first embodiment is shown in FIG. 3. The power supply apparatus has a DC power supply unit 14 which rectifies an AC voltage supplied from a commercial AC voltage source 12 connected between power supply input terminals 10a and 10b of the apparatus, and smoothes the voltage resulting from the rectification. The DC power supply unit 14 includes known rectifying and smoothing circuitry.

The DC voltage from the DC power supply unit 14 is applied to a DC-to-DC converter unit 16 for converting the received DC voltage to a voltage having a predetermined value. The DC-to-DC converter unit 16 includes a DC-to-high-frequency converter, e.g. inverter, 16a which converts the DC voltage to a high frequency voltage. The inverter 16a includes a plurality of semiconductor switching devices, e.g. IGBTs, bipolar transistors or FETs. The conduction period of the semiconductor switching devices is controlled by a control signal applied from a control unit, e.g. a driving unit 18, for thereby controlling the resulting high-frequency voltage. In other words, the inverter 16a is an externally controlled DC-to-high-frequency converter. The high-frequency voltage from the inverter 16a is converted to a high-frequency voltage having a predetermined value by a transformer 16b, and the resultant high-frequency voltage is converted to a DC voltage in a high-frequency-to-DC converter, e.g. a rectifying circuit, 16c. The DC voltage developed between output terminals 20P and 20N of the power supply apparatus is applied to a lamp, e.g. a xenon lamp, 22 which is a load. As described previously, the xenon lamp 22 exhibits an increased impedance when its life is nearing an end.

A current detector 24 is connected between the rectifying circuit 16c and the output terminal 20P, which detects a DC current (load current) supplied from the rectifying circuit 16c to the xenon lamp 22 and develops a DC current representative signal representing the detected DC current.

A voltage detector 26 is connected between the output terminals 20P and 20N. The voltage detector 26 detects a DC voltage (load voltage) applied from the rectifying circuit 16c to the xenon lamp 22 and develops a DC voltage representative signal representing the detected DC voltage.

The current representative signal from the current detector 24 has its level adjusted by a level adjuster 28 before it is applied to a multiplier 30. The multiplier 30 receives the DC voltage representative signal from the voltage detector 26, too. Accordingly, the output of the multiplier 30 is a power representative signal which is proportional to the power (load power) supplied to the xenon lamp 22. Thus, the current detector 24, the voltage detector 26, the level adjuster 28 and the multiplier 30 form a power detector. The level adjustment provided by the level adjuster 28 will be described later.

The current representative signal from the current detector 24 is applied also to a constant-current control error amplifier 32 forming part of an error signal generating unit. The constant-current control error amplifier 32 receives a DC current reference signal from a DC current reference signal source 34, too, and develops a DC current error signal representing the difference between the current representative signal from the current detector 24 and the DC current reference signal.

When the driving unit 18 receives the DC current error signal from the error amplifier 32, it controls the inverter 16a in such a manner that a constant DC current according to the DC current reference signal is supplied to the xenon lamp 22. In other words, the inverter 16a is constant-current controlled.

The power representative signal from the multiplier 30 is applied to a constant-power control error amplifier 36, which receives a DC power reference signal from a DC power reference signal source 37, too. The constant-power control error amplifier 36 develops a DC power error signal representing the difference between the power representative signal and the DC power reference signal.

When the driving unit 18 receives the DC power error signal, it controls the inverter 16a in such a manner that constant power according to the DC power reference signal is supplied to the power supplied to the xenon lamp 22. Thus, the inverter 16a, in this case, is constant-power controlled.

In the illustrated example, the DC current error signal from the constant-current control error amplifier 32 is applied to selecting means. The selecting means may be, for example, an OR gate 38, and the DC current error signal is applied to one input terminal 38a of the OR gate 38, of which the other input terminal 38b receives the DC power error signal from the constant-power control error amplifier 36. The OR gate 38 has its output terminal 38c connected to the driving unit 18.

The OR gate 38 includes switching means connected between the input terminal 38a and the output terminal 38c. The switching means may be, for example, a switching diode 40 having its anode connected to the input terminal 38a and having its cathode connected to the output terminal 38c.

Similarly, another switching means is connected between the input terminal 38b of the OR gate 38 and the output terminal 38c. The switching means may be, for example, a switching diode 42 having its anode connected to the input terminal 38b and having its cathode connected to the output terminal 38c of the OR gate 38.

With this arrangement, when the DC current error signal from the constant-current control error amplifier 32 is greater than the DC power error signal from the constant-power control error amplifier 36, the diode 40 is rendered conductive, and, therefore, the DC current error signal is coupled to the driving unit 18. On the other hand, when the DC power error signal from the constant-power control error amplifier 36 is greater than the DC current error signal from the constant-current control error amplifier 32, the diode 42 is rendered conductive, so that the DC power error signal is coupled to the driving unit 18.

As the xenon lamp 22 is used longer, its impedance increases accordingly. Under the constant-current control, a change in value of the current representative signal is small even if the impedance of the xenon lamp 22 changes. In contrast, when the xenon lamp 22 is being constant-power controlled, an increase in impedance of the lamp 22 causes the power consumed in the lamp 22 to increase, resulting in increase in value of the power representative signal.

According to the present invention, a value of the impedance of the xenon lamp 22 indicating that the life of the lamp 22 is nearing to its end is empirically predetermined. When the impedance of the xenon lamp exceeds this predetermined value, the xenon lamp is considered to have come near to the end of its life. The level adjuster 28 adjusts the level of the DC current representative signal to be supplied to the multiplier 30 in such a manner that the DC current error signal has a larger value than the DC power error signal when the impedance of the xenon lamp 22 is smaller than the predetermined value, and that the DC power error signal has a larger value than the DC current error signal when the impedance of the xenon lamp 22 is larger than the predetermined value.

Figure 4:
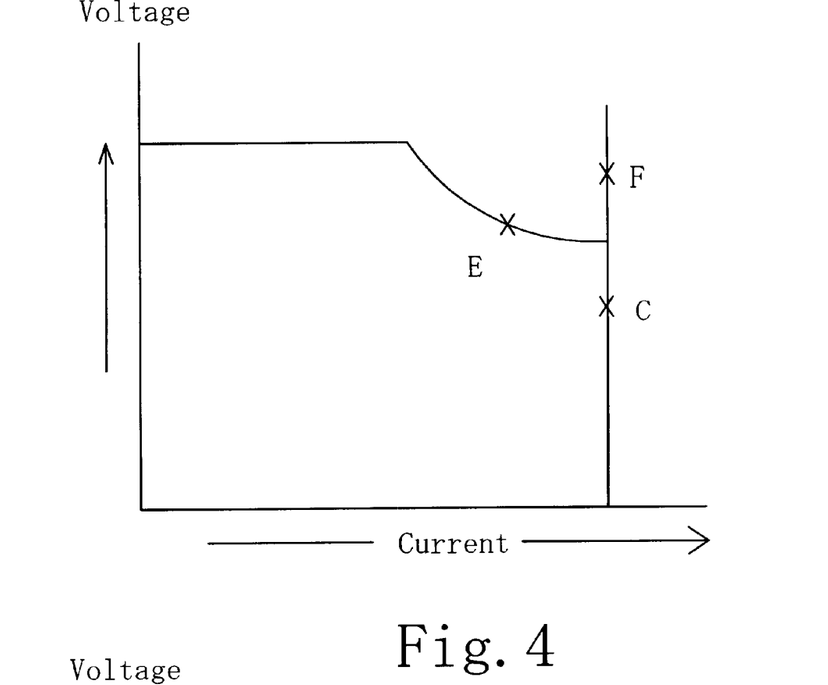
FIG. 4 shows a voltage-current characteristic of a xenon lamp powered from the power supply apparatus shown in FIG. 3.

Accordingly, when the xenon lamp has not been used long and, therefore, its impedance is smaller than the predetermined value, the DC current error signal from the error amplifier 32 is applied to the driving unit 18, and, therefore, the xenon lamp 22 operates, being constant-current controlled, at an operating point, for example, a point C on a voltage-current characteristic curve of the xenon lamp 22 shown in FIG. 4.

On the other hand, if the xenon lamp 22 is a lamp which has been long used and, therefore, has an impedance larger than the predetermined value, the DC power error signal is applied from the error amplifier 36 to the driving unit 18, and, therefore, the lamp 22 operates, being constant-power controlled, at an operating point, for example, a point E on the curve shown in FIG. 4. In the constant-power control state, as the load voltage increases with increase in impedance of the lamp 22, the load current decreases, so that the melting of the anode and cathode electrodes of the xenon lamp 22 can be prevented.

With the above-described arrangement, if the xenon lamp 22 has an increased impedance, the constant-power control is started when power starts to be supplied to the lamp 22. Accordingly, as stated previously, it may sometimes occur that the xenon lamp 22 is not started. In order to avoid it, according to the present invention, an interrupting circuit having an arrangement described below is used in the error signal generating unit.

Specifically, the level-adjusted DC current representative signal is supplied from the level adjuster 28 to a delay circuit 42. The delay circuit 42 may be formed of a time constant circuit including, for example, a resistor 44 and a capacitor 46. Before the power supply apparatus starts operating, the capacitor 46 has no charge. When the power supply apparatus starts operating, so that current starts to be supplied to the xenon lamp 22, the voltage across the capacitor 46 gradually increases. The voltage across the capacitor 46 is applied to a comparator 48, which receives also a delay time setting signal from a delay time setting signal source 50. The comparator 48 develops an output signal in a first state, e.g. at an L-level, when the voltage across the capacitor 46 is smaller than the delay time setting signal, and develops an output signal in a second state, e.g. at an H-level when the voltage across the capacitor 46 is equal to or higher than the delay time setting signal. Accordingly, the output signal of the comparator 48 is at the L-level for a time period of, for example, from 20 to 100 milliseconds, set by the delay time setting signal from the time when the power supply apparatus starts operating.

A clamping diode 52 has its cathode connected to the output terminal of the comparator 48 and has its anode connected to the output of the multiplier 30. Accordingly, during a time period in which the output signal of the comparator 48 is at the L-level, the clamping diode 52 becomes conductive, which results in clamping of the output signal of the multiplier 30, resulting, in turn, disappearance of the DC power error signal from the constant-power control error amplifier 36, and application of the DC current error signal through the OR gate 38 to the driving unit 18. Thus, the xenon lamp 22 is constant-current controlled.

Thus, even if the impedance of the xenon lamp 22 has become large due to the aging, the lamp 22 operates at an operating point, for example, a point F shown in FIG. 4 for a time period of from 20 to 100 milliseconds starting from the beginning of operation of the power supply apparatus (i.e. from the beginning of application of current to the xenon lamp 22). At the operating point F, larger current is supplied to the lamp 22 than in the constant-power control. The larger current in combination with the large impedance results in larger power to be supplied to the xenon lamp 22, so that the lamp 22 can be turned on without fail.

In this case, the time period in which constant-current control is performed is relatively short, for example, from 20 to 100 milliseconds, and, therefore, the large power supplied to the xenon lamp 22 destroys neither the lamp 22 nor the power supply apparatus itself.

When the time period of from 20 to 100 milliseconds lapses, the level of the output signal of the comparator 48 changes to the H-level, which makes the clamping diode 52 nonconductive. Then, the constant-power control error amplifier 36 provides a normal DC power error signal, which is larger than the DC current error signal if the life of the xenon lamp 22 is near to its end. Accordingly, the control is switched from the constant current control to the constant-power control as indicated by, for example, the operating point E in FIG. 4, where a smaller current is supplied to the xenon lamp 22.

When the xenon lamp 22 exhibits a small impedance, the DC current error signal is larger than the normal DC power error signal, and, therefore, the constant-current control is continued. It should be noted that, in this case, power corresponding to the operating point C (FIG. 4) is continuously supplied to the lamp 22 from the beginning of the operation of the power supply apparatus.

Figure 5:
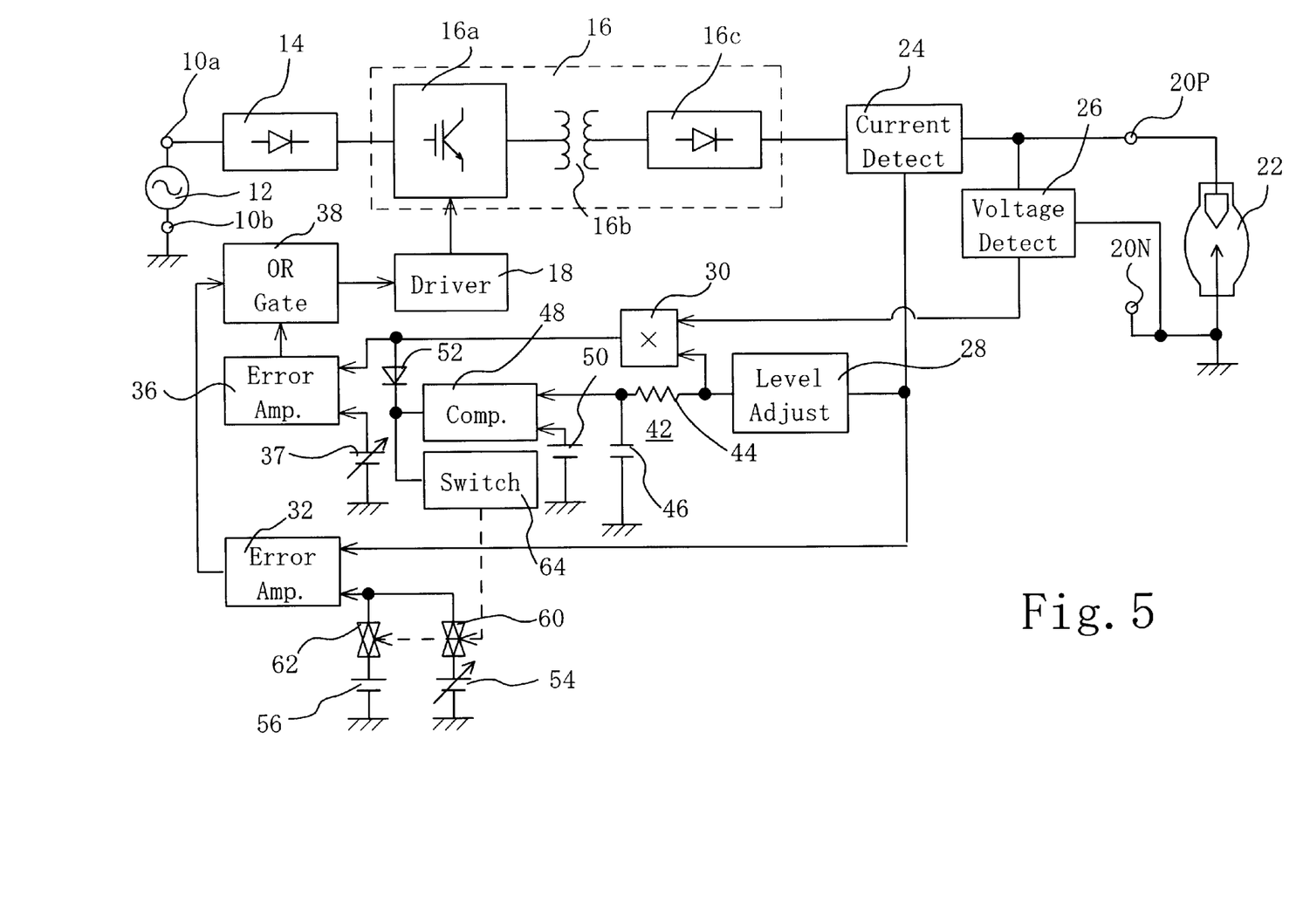
FIG. 5 is a block circuit diagram of a power supply apparatus according to a second embodiment of the present invention.

A power supply apparatus according to a second embodiment of the present invention is shown in FIG. 5. The only difference of the power supply apparatus of FIG. 5 from the one shown in FIG. 3 is that it employs two different DC current reference signals. Those components shown in FIG. 5 which have the same reference numerals as used in FIG. 4 are the same components as used in the apparatus of FIG. 4, and, therefore, no further description about them is give hereinafter.

Associated with the constant-current control error amplifier 32 are two DC current reference signal sources, namely, a first DC current reference signal source, e.g. a DC current reference signal source 54 providing a variable DC current reference signal for use in starting the xenon lamp 22, and a second DC current reference signal source, e.g. a DC current reference signal source 56 providing a DC current reference signal for use in operating the xenon lamp 22 in a steady state. The DC current reference signal for use in starting the lamp 22 has a larger value than the DC current reference signal for use in operating the lamp 22 in its steady state.

The starting DC current reference signal for use in starting the lamp 22 from the reference signal source 54 is coupled to a first input terminal of the constant-current control error amplifier 32 through an analog switch 60 which forms a part of the selecting means. The steady-operation DC current reference signal from the reference signal source 56 is coupled to the first input terminal of the error amplifier 32 through an analog switch 62 forming a part of the selecting means.

The analog switches 60 and 62 are controlled by a switching device 64, which renders the analog switches 60 and 62 conductive and nonconductive, respectively, when the L-level output signal is applied to it from the comparator 48, and renders the analog switches 60 and 62 nonconductive and conductive, respectively, when the H-level output signal from the comparator 48 is applied to it. Thus, for the predetermined time period, set by the delay circuit 42, from the start of operation of the power supply apparatus, the starting DC current reference signal is applied to the constant-current control error amplifier 32, and after the predetermined time period lapses, the steady-operation DC current reference signal is applied to the constant-current control error amplifier 32.

Figure 6:
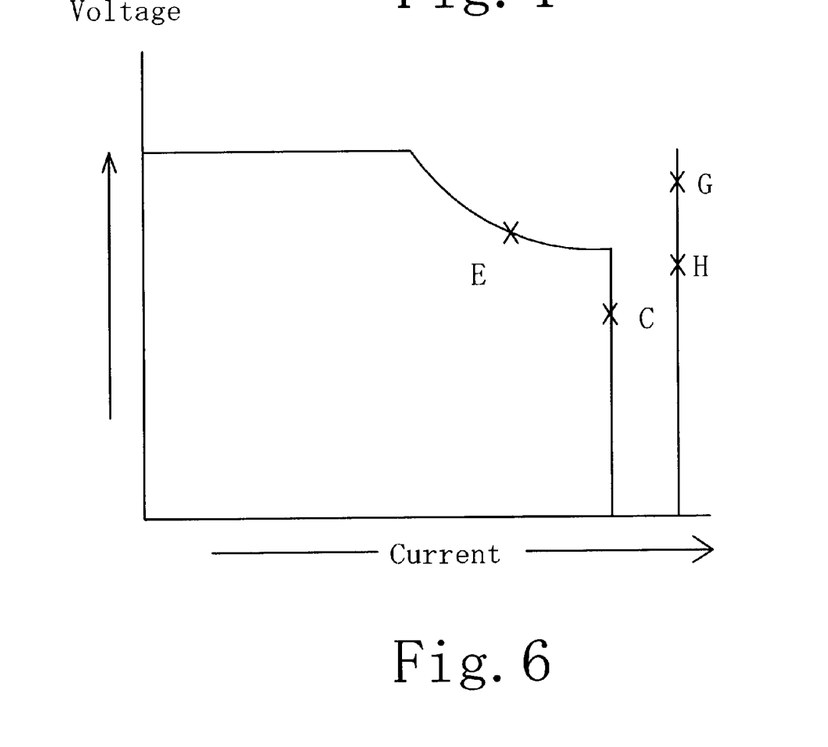
FIG. 6 shows a voltage-current characteristic of a xenon lamp powered from the power supply apparatus shown in FIG. 5.

When the xenon lamp 22 has a high impedance due to, for example, long use of the lamp 22, the xenon lamp 22 operates at an operating point G on the voltage-current characteristic curve shown in FIG. 6, and, therefore, large current is supplied to the lamp 22 so that the operation of the lamp 22 can be started without fail. After that, the constant-power control is performed, and the operating point moves to the point E, where a decreased current is supplied to the xenon lamp 22, which prevents the electrodes of the lamp 22 from melting.

If the xenon lamp 22 is a new one and, therefore, has a low impedance, it operates at an operating point H shown in FIG. 6, where a large constant current is supplied to the lamp 22, which can start the operation of the lamp 22 without fail. The different operating points G and H are for different impedances of the xenon lamp 22 when it is new and when it is used long time. After the predetermined time period lapses, the operating point moves from H to C, where the current flowing through the xenon lamp 22 is controlled to become equal to the current value determined by the steady-operation DC current reference signal.

Figure 7:
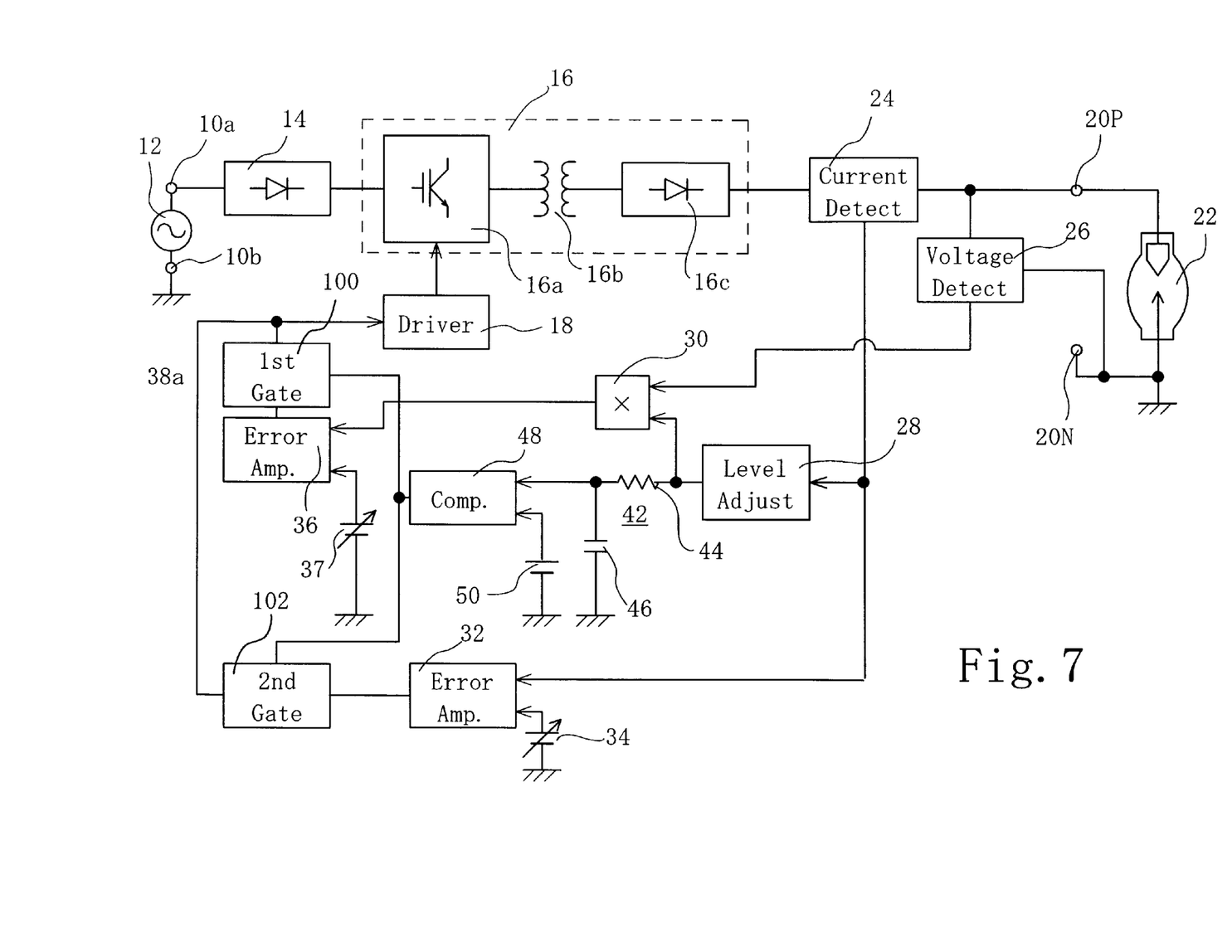
FIG. 7 is a block circuit diagram of a modification of the power supply apparatus shown in FIG. 3.

According to the first and second embodiments, constant-current control is provided for a predetermined time period following the start of operation of the power supply apparatus, and whether the constant-current control is to be continued or constant-power control is to be done after the initial constant-current control is determined, depending on the magnitude of the impedance of the xenon lamp 22. However, the apparatus may be so arranged that constant-current control is always followed by constant-power control. In such a case, the circuit shown in FIG. 5 may be modified to the form as shown, for example, in FIG. 7, by removing, for example, the OR gate 38 and the clamping diode 52, and providing selecting means including a first gate circuit 100 and a second gate circuit 102. The first gate circuit 100 receives the output signal of the constant-power control error amplifier 36, and the second gate circuit 102 receives the output signal of the constant-current control error amplifier 32. The output signals of the first and second gate circuits 100 and 102 are applied to the driving unit 18. The first and second gate circuits 100 and 102 receive also the output signal of the comparator 48. When the output of the comparator 48 is at the L-level, the first gate circuit 100 is closed with the second gate circuit 102 opened. When the output of the comparator 48 is at the H-level, the first and second gate circuits 100 and 102 are opened and closed, respectively.

According to the first and second embodiments, the output of the multiplier 30 is clamped by means of the output signal of the comparator 48. Instead, the output signal of the constant-power control error amplifier 36 may be clamped by the diode 52.

Also, in place of the interrupting circuit formed of the delay circuit 42, the comparator 48 and the delay time setting signal source 50, a timer circuit may be used, which is started when the power supply apparatus starts operating, and changes the state of the output signal thereof when the predetermined time period lapses.

Instead of adjusting the level of the DC current representative signal by the level adjuster 28, the level of the voltage representative signal may be adjusted. Alternatively, an arrangement may be employed in which the current representative signal and the voltage representative signal, which have not been level-adjusted, are multiplied together in the multiplier 30, and the level of the output of the multiplier 30 is adjusted by a level adjuster. In a still another alternative, such multiplier output may be applied directly to the error amplifier 36 having its output signal level-adjusted.

The OR gate 38 used in the first and second embodiments may be replaced by first and second switching means which receive the output signals of the error amplifiers 32 and 36, respectively, and are opened and closed, or closed and opened, respectively, in response to the output signal from a comparator which compares the output signal of the error amplifier 32 or 36 with a predetermined reference signal.

Also, in place of the inverter 16a of the DC-to-DC converter 16, an appropriate one of various types of externally-driven switching regulators may be used.

What is claimed is:

1. A power supply apparatus for starting and driving a lamp, comprising:

a DC power supply;

a DC-to-DC converter for converting a first DC signal from said DC power supply to a second DC signal having a predetermined magnitude and supplying said second DC signal to said lamp;

a DC current detector developing a DC current representative signal representing DC current supplied from said DC-to-DC converter to said lamp;

a DC power detector developing a DC power representative signal representing DC power supplied from said DC-to-DC converter to said lamp;

an error signal generating unit for generating a DC current error signal representing a difference between said DC current representative signal and a predetermined DC current reference signal and a DC power error signal representing a difference between said DC power representative signal and a predetermined DC power reference signal, said error signal generating unit providing said DC current error signal as an output thereof for a predetermined time period following the start of the operation of said power supply apparatus; and a control unit for controlling said DC-to-DC converter in such a manner as to make a signal from said error signal generating unit substantially zero.

2. The power supply apparatus according to claim 1 wherein said error signal generating unit comprises:

level controlling means adapted for making said DC current error signal larger than said DC power error signal when an impedance of said lamp is smaller than a predetermined impedance value, and making said DC current error signal smaller than said DC power error signal when said impedance of said lamp is larger than said predetermined impedance value;

selecting means for selecting the larger one of said DC current and DC power error signals; and interrupting circuit for interrupting the generation of said DC power error signal for said predetermined time period following the start of the operation of said power supply apparatus.

3. The power supply apparatus according to claim 2 wherein said interrupting circuit comprises a charged circuit charged from said DC current representative signal, and a clamping circuit for clamping said DC power representative signal when an output signal of said charged circuit is smaller than a predetermined interruption reference signal.

4. The power supply apparatus according to claim 2 wherein said power detector comprises a voltage detector developing a DC voltage representative signal representing a DC voltage applied to said lamp, a level adjuster receiving said DC current representative signal and adjusting a level of said DC current representative signal, and a multiplier for multiplying an output signal of said level adjuster with said DC voltage representative signal.

5. The power supply apparatus according to claim 4 wherein:

said error generating unit comprises:

a constant-power control error amplifier receiving an output signal of said multiplier and said DC power reference signal and developing said DC power error signal, and a constant-current control error amplifier receiving said DC current representative signal from said current detector and said DC current reference signal and developing said DC current error signal; and said selecting means comprises:
- a first input terminal for receiving said DC power error signal from said constant-power control error amplifier,
- a second input terminal for receiving said DC current error signal from said constant-current control error amplifier,
- an output terminal coupled to said control unit,
- a first switching device coupled between said first input terminal and said output terminal, said first switching device being rendered conductive when a signal level at said first input terminal is larger than a signal level at said output terminal, and
- a second switching device coupled between said second input terminal and said output terminal, said second switching device being rendered conductive when a signal level at said second input terminal is larger than said signal level at said output terminal.

6. The power supply apparatus according to claim 2 wherein said error signal generating unit generates said DC current error signal based on a first DC current reference signal and said DC current representative signal for said predetermined time period following the start of the operation of said power supply apparatus, and generates said DC current error signal based on a second DC current reference signal smaller in value than said first DC current reference signal and said DC current representative signal after the lapse of said predetermined time period.

7. The power supply apparatus according to claim 6 wherein said error signal generating unit comprises:
- a constant-current control error amplifier receiving said DC current representative signal; and
- a selecting circuit receiving said first and second DC current reference signals, said selecting means being responsive to an output signal of said interrupting circuit for coupling said first DC current reference signal to said constant-current control error amplifier for said predetermined time period following the start of the operation of said power supply apparatus, and coupling said second DC current reference signal to said constant-current error amplifier after the lapse of said predetermined time period.

* * * * *